United States Patent [19]

Udell et al.

[11] Patent Number: 5,018,576
[45] Date of Patent: May 28, 1991

[54] PROCESS FOR IN SITU DECONTAMINATION OF SUBSURFACE SOIL AND GROUNDWATER

[75] Inventors: Kent S. Udell, Berkeley; Nicholas Sitar, Kensington; James R. Hunt, Walnut Creek; Lloyd D. Stewart, Jr., Berkeley, all of Calif.

[73] Assignee: The Regents of the University of California, Oakland, Calif.

[21] Appl. No.: 394,739

[22] Filed: Aug. 16, 1989

[51] Int. Cl.$^5$ .................. E02D 3/11; E21B 43/00; E21B 43/24
[52] U.S. Cl. .................. 166/272; 166/246; 166/370; 210/610; 210/170; 210/747; 405/131; 405/258
[58] Field of Search ............ 166/246, 245, 263, 272, 166/369, 370; 405/128, 258, 131, 263, 264; 210/610, 611, 170, 747, 922

[56] References Cited

U.S. PATENT DOCUMENTS

| | | | |
|---|---|---|---|
| 3,796,262 | 3/1974 | Allen et al. | 166/263 |
| 4,288,174 | 9/1981 | Laws | 405/43 |
| 4,323,122 | 4/1982 | Knopik | 166/369 |
| 4,401,569 | 8/1983 | Jhaveri et al. | 210/747 |
| 4,526,692 | 7/1985 | Yohe et al. | 210/747 |
| 4,593,760 | 6/1986 | Visser et al. | 166/267 |
| 4,597,443 | 7/1986 | Shu et al. | 166/263 |
| 4,608,163 | 8/1986 | Yohe et al. | 210/150 |
| 4,660,639 | 4/1987 | Visser et al. | 166/370 |
| 4,730,672 | 3/1988 | Payne | 166/369 |
| 4,761,225 | 8/1988 | Breslin | 210/104 |
| 4,765,902 | 8/1988 | Ely et al. | 405/128 |
| 4,832,122 | 5/1989 | Corey et al. | 166/272 |
| 4,838,079 | 6/1989 | Harris | 73/155 |
| 4,842,448 | 6/1989 | Koerner et al. | 405/128 |
| 4,848,460 | 7/1989 | Johnson, Jr. et al. | 166/272 |

OTHER PUBLICATIONS

Dickinson, Wade, et al., "Horizontal Radials for Hazardous Waste Remediation", presented at Waste Tech '87, Oct. 26–27, 1987, San Francisco, CA.
Hunt, J. R., et al., "Nonaqueous Phase Liquid Transport and Cleanup"—1. Analysis of Mechanisms, Water Resources Res., vol. 24, No. 8, pp. 1247–1258, (Aug. 1988).
Hunt, J. R., "Nonaqueous Phase Liquid Transport & Cleanup—2. Experimental Studies", Water Resources Research, vol. 24, No. 8, pp. 1259–1269, (Aug. 1988).
Stewart, L. D., et al., "Mechanisms of Residual Oil Displacement by Steam Injection", SPE Reservoir Engineering, Nov. 1988, pp. 1233–1242.
Hunt, J. R., "Organic Solvents and Petroleum Hydrocarbons in the Subsurface: Transport and Cleanup", Sanitary Eng. and Environ. Health Research Lab., University of California, Berkeley, Aug. 29, 1986, UCB-SEEHRL Report No. 86-11.

Primary Examiner—Bruce M. Kisliuk
Attorney, Agent, or Firm—Flehr, Hohbach, Test, Albritton & Herbert

[57] ABSTRACT

A method is provided for in situ decontamination of contaminated subsurface area by injection of steam into injection wells and withdrawing liquids and vapors from extraction wells under subatmospheric pressure whereby steam is passed through the contaminated area in an essentially horizontal direction. After a substantial portion of the contamination has been removed in this manner, the injection of steam is ceased, but the extraction at subatmospheric pressure is continued, to volatilize and remove the residual water and contaminants trapped in the pores of the soil. The steam injection may be periodically resumed to reheat the area and to replenish the water in the pores.

8 Claims, 3 Drawing Sheets

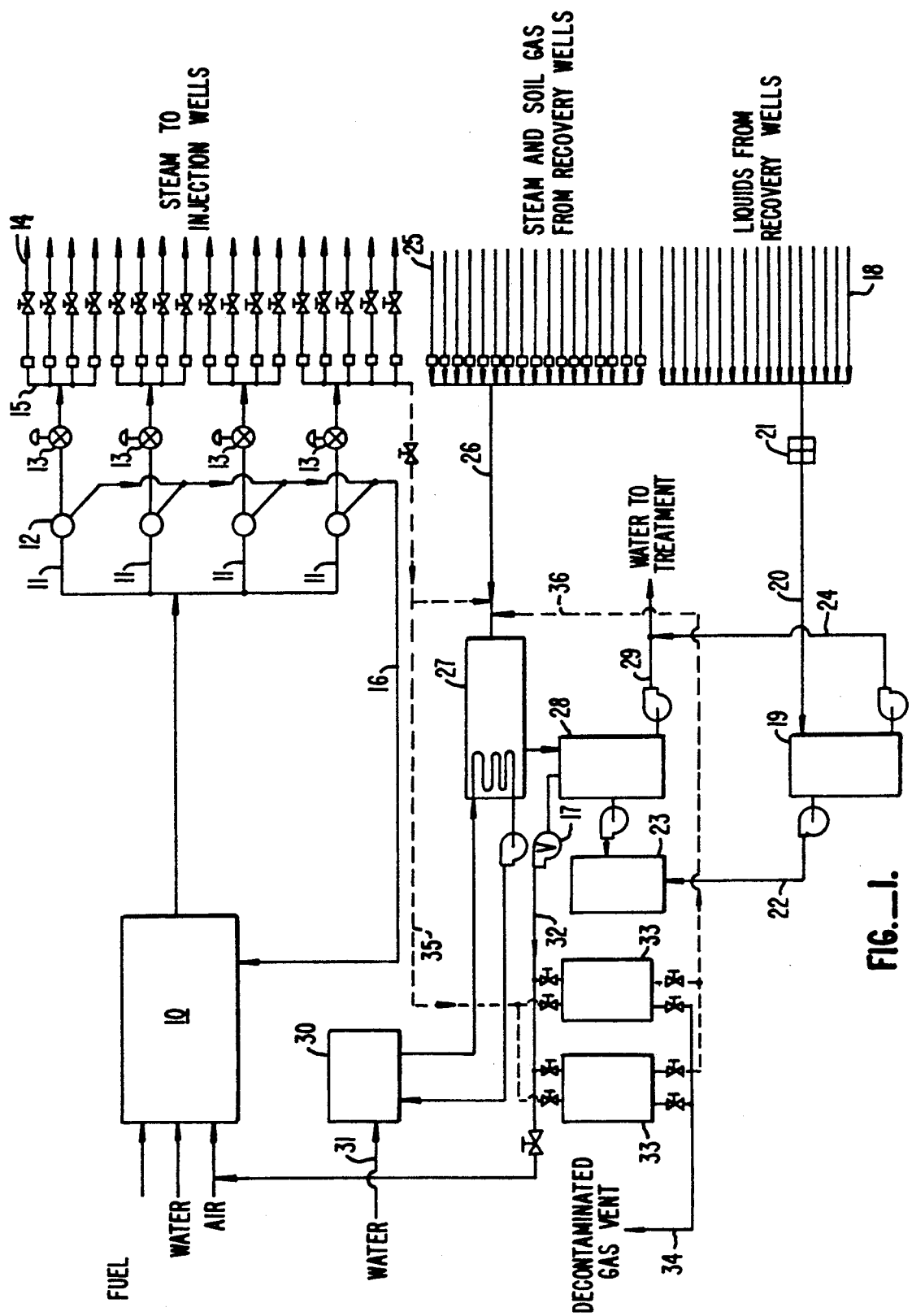
FIG._1.

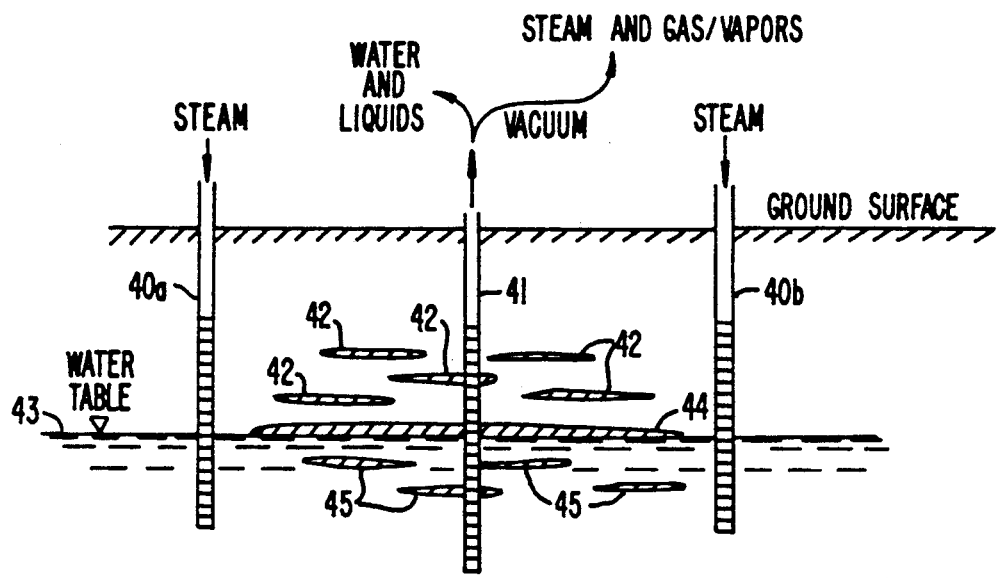
FIG._2A.
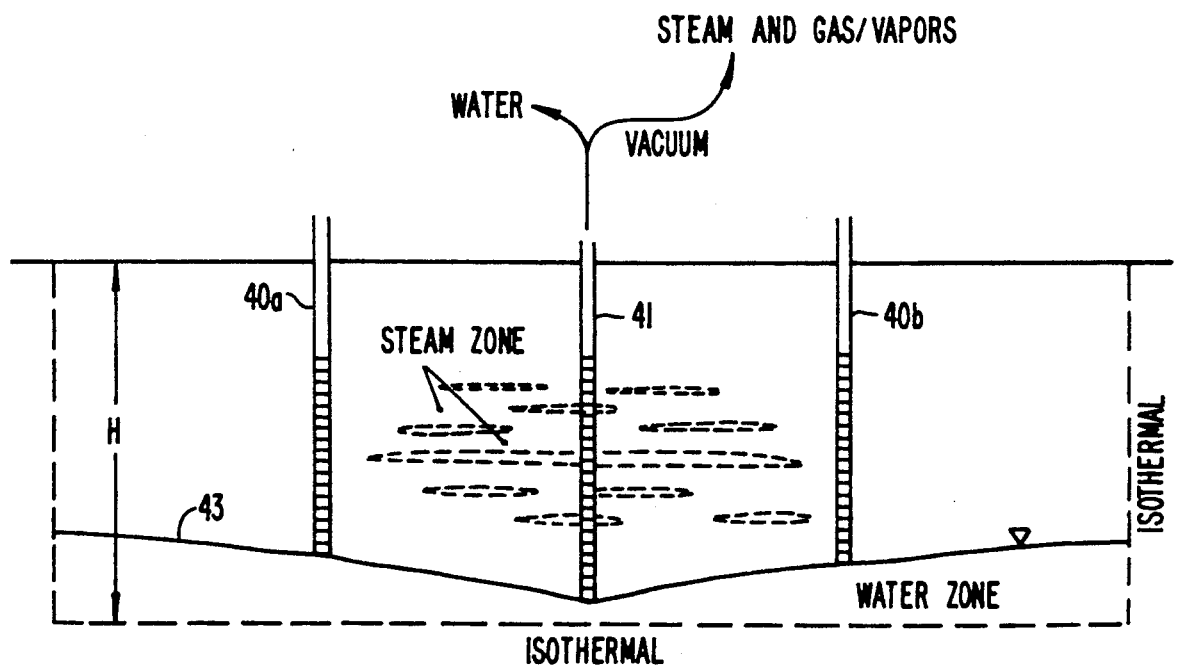
FIG._2B.

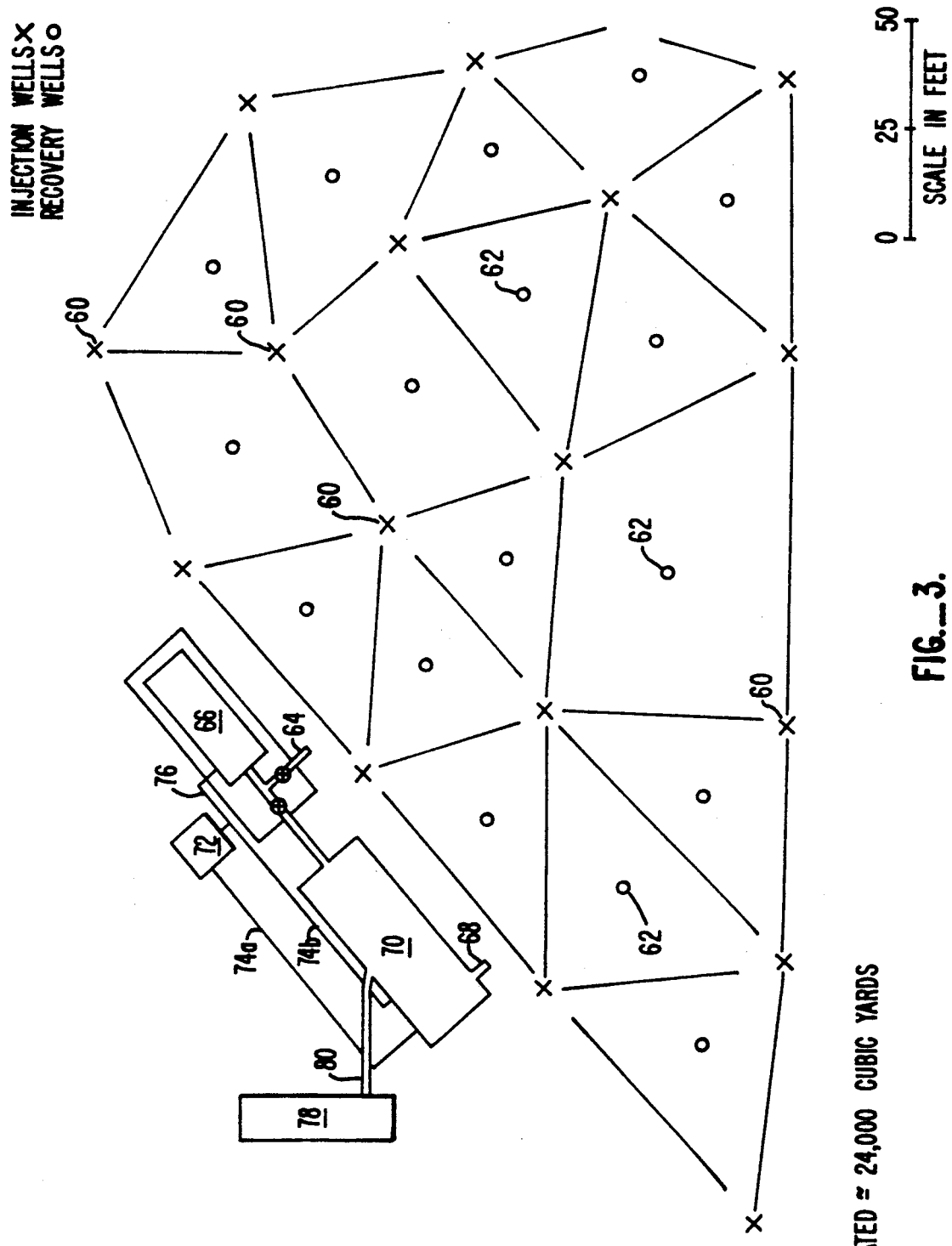
FIG._3.

PROCESS FOR IN SITU DECONTAMINATION OF SUBSURFACE SOIL AND GROUNDWATER

The present invention is directed to a process for in situ decontamination of a contaminated subsurface area. In particular, the present invention is directed to a method for removing subsurface contamination by steam injection horizontally through the contaminated area with extraction of fluids at subatmospheric pressure through recovery wells, with the subatmospheric pressure being applied to the recovery wells for a period of time after cessation of steam injection sufficient to remove residual water and other contaminants vaporized from the pores of the subsurface soil by the residual heat in the soil.

BACKGROUND OF THE INVENTION

In recent years the problem of groundwater contamination by organic solvents and other petroleum products has reached significant proportions. The contaminating compounds involve organic solvents used, for example, in the electronics and chemical industries, and petroleum hydrocarbons. Many of these compounds are generally hydrophobic with low water solubilities resulting in the presence of separate underground liquid phases. Methods for cleaning up contaminated sites heretofore used consist of a combination of (a) removal of the contaminated soil; (b) withdrawal of liquids existing as a pool floating in the aquifer (a water-bearing stratum) or at the bottom of the aquifer followed by (c) groundwater extraction or vacuum pumping of soil gas to remove residual contamination. In some cases, groundwater extraction or vacuum pumping of soil gas is used exclusively. However, such methods may be inefficient since the conditions required to mobilize the organic fluid trapped in the pore spaces in the soil cannot be met and the dissolution or vaporization of the contaminant fluid in the flowing groundwater or soil gas is limited by mass transfer constraints imposed by the distribution of contaminants in regions not readily contacted by the flowing fluids. Therefore, in decontamination by water or gas pumping, it is not known how much water will have to be pumped, for how long, or whether the pumping will be effective.

Most of the substances comprising spills are only slightly soluble in water. (i.e., much less than 1 gram per hundred grams) and many are heavier than water. Fluid viscosities are generally less than water and boiling points are usually comparable to that of water. Once liquid contaminant is released into the soil in a sufficient quantity, it tends to sink toward the water table regardless of density. In the process of migration, this liquid follows zones of the highest permeability or fractures leaving behind small masses or ganglia trapped in some of the pores of the soil. The amount of organic liquid left behind in the pores is the residual saturation. Expressed as the fraction of the void space occupied by the hydrocarbon contaminate, residual saturations in saturated porous media have been reported as 10% for a light oil and 20% for a heavy oil; 0.75–1.25% (oil contamination) in a highly permeable media, and 7.5–12.5% within an unsaturated zone in a low permeability medium.

Liquids heavier than water move downward into the capillary fringe in the water table while liquids lighter than water tend to spread laterally when they encounter the capillary fringe and the water table. Groundwater withdrawal as a method of clean-up is intended to depress the water table in order to recover the spill (such as gasoline) as a separate phase. However, the amount of free product typically recovered using this method has been significantly less than the estimated amount of the spill. This can be partly explained by the complexity of the geometric distribution of the contaminated zone in a field situation. Because of natural depositional processes, even very uniform sedimentary deposits contain interfingering sequences of finer and coarser layers. This layering leads to lateral spreading of second-phase (nonaqueous phase) liquid during its downward migration and especially when it encounters a barrier such as the water table or a very low permeability layer. In addition, the water table is a dynamic surface which moves up and down in response to seasonal recharge and discharge along with local pumping. As a result, the zone contaminated by a lighter-than-water liquid may extend over the entire range of the height of water table fluctuations. This can result in lenses of the contamination phase, not only above the water table, but sometimes even below the water table.

The net effect of redistribution of the contamination phase by a dynamic water table is that a significant portion of the contamination phase may be effectively trapped in the pore spaces, and adsorbed on the soil grains, especially during the periods of lower water table levels. During period of high water tables, some of the contamination phase in large continuous lenses can be remobilized and is recoverable, however, much of it cannot be mobilized by the hydrodynamic forces produced in a typical pumping operation.

Methods have been utilized to attempt to remove trapped residual liquid (i.e., trapped either in liquid lenses or trapped in the pore spaces of the soil) by pumping water to remove the constituents dissolved in the groundwater and by vacuum pumping above the water table to remove volatile constituents. In both instances the rates of removal are slow since they are controlled by diffusion and solution kinetics.

Biodegradation may be effective in some situations, but it is also a relatively slow process, particularly when dealing with a separate liquid phase contamination. The effectiveness of biodegradation is also highly dependent on soil conditions, which are difficult to control, such as oxygen levels, moisture content, temperature, availability of nitrogen and phosphorous, and pH.

U.S. Pat. No. 4,761,225 discloses removal of liquid hydrocarbons from the groundwater by using perforated well casings, a set of pump chambers and a control system which is powered by compressed air. Liquid hydrocarbons and groundwater are drawn up through the recovery unit into pump canisters by suction and then pressurized gas is directed to individual wells to push the liquid hydrocarbons from the wells to the storage recovery tank at ground level.

U.S. Pat. No. 4,832,122 discloses a method for decontamination by using injectors located below the water table to inject fluid or gases upwardly through the contaminated area. However, a disadvantage of injecting a fluid or gas upwardly through a contaminated zone is that the withdrawal of water through the extractor (usually horizontally located above the contaminated zone), is less efficient since the extraction is working against the force of gravity. Thus the extraction of water and other condensate is not optimally efficient.

An alternate way to remove a contaminant is to physically displace the contamination phase from the porous medium by the injection of steam. The present invention is directed to a method which improves upon the method of injecting steam into the contaminated zone as a means of recovering contaminants.

Accordingly, it is an object of the present invention to remediate and decontaminate a site contaminated with a waste material in an effective, rapid and safe manner.

Another object of the present invention is to provide a method of soil decontamination which volatilizes and displaces compounds which are not significantly volatile at ambient temperatures and pressures.

Another object of the present invention is to provide an improved technique of soil remediation which does not require excavation of the contaminated area.

Another object of the present invention is to provide an improved technique of soil remediation which minimizes the volume of contaminated water which must be removed from the contaminated site.

Further advantages of the invention will become apparent from the following description and from the practice of the invention.

SUMMARY OF THE INVENTION

The present invention provides a process for in situ decontamination of contaminated subsurface area containing volatile contaminants, nonvolatile aqueous soluble contaminants and nonvolatile nonaqueous soluble contaminants, comprising the steps of constructing an injection well system comprising a plurality of injection wells located proximate to the periphery of and/or located within the contaminated area; constructing at least one extraction well disposed within the contaminated area spaced apart from the injection wells; concurrently injecting steam through the injection well system and extracting at subatmospheric pressure through the extraction well whereby steam is drawn in a substantially horizontal direction through the subsurface contaminated area to mobilize and extract a substantial amount of volatile and nonvolatile contaminants from the contaminated area while groundwater, some steam, soil gas and contaminants are withdrawn through the extraction well; and then ceasing the injection of the steam through the injection wells while continuing the extraction at subatmospheric pressure at the extraction well to withdraw residual aqueous phase and gases from the contaminated area which are volatilized from the residual heat in the contaminated area. Steam injection may be resumed periodically, as necessary to maintain an elevated temperature in the soil.

BRIEF DESCRIPTION OF THE DRAWINGS

FIG. 1 shows a schematic diagram of a preferred configuration for steam generation equipment, and gas and liquid recovery equipment for use in conjunction with the present invention.

FIG. 2A is a schematic elevational view of injection and extraction wells in a contaminated area according to the present invention showing the area of contamination;

FIG. 2B is a schematic elevation view of the area of FIG. 2A which has been decontaminated by the application of steam during the process of the present invention.

FIG. 3 shows an exemplary layout of injection and recovery wells and recovery equipment in plan view.

DESCRIPTION OF THE PREFERRED EMBODIMENTS

In order to remove contamination from a contaminated area according to the present invention a well system is constructed in which wells are vertically disposed within and around a suspected contaminated zone. The wells are conventional wells which can be used to inject gases in a horizontal direction through the contaminated zone. Located among and spaced apart from the injection wells is one or more extraction wells, vertically disposed in order to withdraw gases and fluids from the contaminated zone in a horizontal direction by application of subatmospheric pressure to the well by use, for example, of vacuum pumps. The extraction well should extend below the location where the deepest penetration of the contamination is suspected. Using this system, steam may be injected into the injection wells, then the steam will travel in a horizontal direction through the contaminated area, drawn towards the extraction well whereby steam, soil gases, water, volatile contaminants and some nonvolatile contaminants are withdrawn. During the course of steam application, the contaminated zone and area immediately surrounding it will be heated and can be considered essentially an isothermal mass. This mass will remain hot, i.e., close to the temperature of steam, for a substantial period of time, even after cessation of steam injection. Some areas may even be superheated to above steam temperature.

The invention is based in part on applicants' discovery that even after the steam injection is ceased, there is residual water and contaminants which remain trapped within the pores of the soil, which are essentially inaccessible to the steam treatment. This residual water trapped within the pores is diluted in contaminant concentration as steam moves through the area, however, contamination is not completely removed, partially because the trapped water is not completely removed. According to the present invention, steam is applied so that it moves horizontally through the decontaminated area and is removed under subatmospheric pressure through extraction wells. This is done for a period of time until the contamination found in the extracted fluids and gases appears at a relatively steady minimum level of contamination. Further steam extraction will no longer be efficient in terms of time and energy costs, based on the small amount of contamination which is being removed. At this point, the injection of steam is ceased, but the application of subatmospheric pressure at the extraction wells is continued. It has been unexpectedly found that by continuing to extract under subatmospheric pressure while ceasing the steam injection, the residual heat in the contaminated area is sufficient to (a) vaporize most of the residual water trapped in the pores (which would not otherwise be removable by steam extraction) and (b) remove residual volatiles and even nonvolatiles which may not otherwise be removable during steam extraction. This latter result is due at least in part to the increase of the effective vapor pressures of some of the liquid components through an increase in the relative concentrations of the contaminants remaining after steam treatment. The subsurface can be placed under subatmospheric pressure since there is no longer any positive application of pressure through the injection wells.

By continuing the application of subatmospheric pressure to the extraction wells, the contaminated zone can be essentially dried to be freed of any residual water and volatile matter trapped in the pores, resulting in a cleaner site than would have been obtained had the steam and vacuum simultaneously ceased. Steam injection may be periodically resumed to maintain an elevated temperature and to replenish the pore water with the steam condensate.

Referring to the figures, in FIG. 1 there is shown a preferred embodiment for generating steam and processing the extracted gases and fluids from the contaminated site. Steam generator 10 having a supply of fuel, water and air for operation, supplies steam at a specified flow rate and pressure to each of the injection wells by way of a plurality of lines 11, each equipped with liquid traps 12 and pressure regulators 13. Each of the lines 11 may serve a plurality of injection wells through lines 14 by use of manifolds 15. Any collected condensate in the traps may be returned through line 16 to the steam generator 10.

Still referring to FIG. 1, a negative pressure is maintained on each recovery well by a high-volume vacuum pump 17 which draws gases from the soil. The liquids are pumped from the bottom of the recovery wells and directed through lines 18 into separation tank 19 via line 20 through which flow is controlled by flow meter 21. Separate phase contaminant is removed from the separation tank and pumped via line 22 to storage tank 23. The contaminated water is pumped via line 24 to another storage area (not shown) for processing.

The recovered gases from the extraction wells are passed from the wells through lines 25 and 26 into condenser 27. Condensate (including water and contaminants) is sent to separation tank 28 from which separate phase contaminant is pumped to storage tank 23 and water is pumped via line 29 to a storage area (not shown) for further treatment. A cooling tower 30 or air-water heat exchanger maintains the condenser water supply at ambient temperature. A make-up supply of water is acquired via line 31 to replace the water which is lost by evaporation to the atmosphere, if a cooling tower is used. Gases which pass through the condenser 27 and separation tank 28 are passed via line 32 to a carbon adsorption system comprising a series of carbon canisters 33 which can be operated either singly or in combination which adsorb contaminants present in the air stream, thereby purifying the air which allows it to be vented into the atmosphere via line 34. The filtering system can be regenerated in place by passing steam through the canisters 33 via line 35. This reduces the volume of contaminated carbon which must be transported to and from the site. The gases and liquids removed from the steamed carbon canisters 33 may be treated exactly as those recovered from recovery wells by introduction into the condenser via line 36.

Referring to FIG. 2A there is shown an elevational view of two injection wells 40A and 40B and an extraction well 41 sunk into a subsurface contaminated zone characterized by trapped lenses of contaminants 42 located above the water table level 43; trapped lenses of contaminants 44 at or near the water table and trapped lenses of contaminants 45 below the water table level. There is also residual contamination of lower concentration trapped within the pores of the soil (not shown) surrounding the lenses 42, 44 and 45.

The depth of the contamination determines the injection pressure of the steam through wells 40A and 40B since the injection pressure should not exceed a pressure which would cause vertical fractures to form. This fracturing pressure is proportional to the weight of the soil which increases with depth. The negative pressure placed on the recovery well 41 is determined by the size of the vacuum pump used and the pressure should be as low as is practically possible. Once maximum pressure difference between the injection wells (40A and 40B) and the recovery well 41 is determined, the optimum spacing between each well may be determined to ensure that the viscous forces of the horizontally flowing steam are greater than the hydrostatic forces, so that the steam is forced horizontally through the soil fast enough to prevent the steam from by-passing the contaminant zone from above. The viscous force of steam may be readily determined by those of ordinary skill by Darcy's Law. By equating the viscous forces to the hydrostatic forces, the maximum spacing of injection of the recovery wells may be determined.

Similarly, the number of wells which should be utilized may be determined. The vertical extent of contamination determines the interval at which steam is injected to ensure that the entire contaminated region is steamed. Given the pressures, well spacing, soil permeability and injection interval, the flow rate of steam injected may be calculated and used to size the boiler or steam generator by those of ordinary skill in the art.

During operation, steam flows laterally from the sides of wells 40A and 40B towards extraction well 41 passing through the contaminated zone. Water and liquids are pumped from the bottom of well 41 as described above in connection with FIG. 1. Gases, vapors and steam are withdrawn under vacuum through the well 41.

After a sufficient period of steam extraction, essentially all of the contaminants in the contaminated lenses 42, 44 and 45 will be removed as well as many of the volatile materials in the soil surrounding the lenses and in the contaminated area. At this point, the entire contaminated zone and area surrounding it are essentially isothermal to a depth of H as shown in FIG. 2B. Also, the water table at the bottom of the extraction well 41 has been depressed due to pumping of water from the bottom of the well. By analyzing the contamination contained in the water, liquids and steam and vapors being removed during application of steam, it will be noted that after a period of time the reduction of the level of contamination will be reduced to the point at which further application of steam does not result in any significant removal of contaminants. At this point, as shown in FIG. 2B, the steam is ceased, but the extraction at subatmospheric pressure is continued whereby vapors (and liquid, if any) are removed from the extraction well 41. At this point the residual water trapped within the pores of the soil is vaporized, both due to the residual heat within the isothermal heated zone and due to the reduction of pressure from the application of subatmospheric pressure at well 41. This results in the removal of not only residual water, but additional volatiles and some nonvolatiles, thus improving the overall decontamination process. The steam is generated locally in areas where water is trapped in the pores as indicated by the steam zone shown in FIG. 2B.

If significant contaminant concentrations are observed in the recovered fluids and the portion of gas recovered by vacuum pumping that is noncondensable (i.e., air) is large, then the injection of steam may be resumed to bring the soil temperature back to the steam temperature and to replenish the pore water.

As an added feature of the present invention, by use of steam, the subsurface area contacted by the steam and/or exposed to the heat caused by the steam is essentially sterilized of native bacteria, fungi, etc. (collectively called biota). After cooling of the contaminated area, specialized biota for biodegradation may be introduced into the contaminated area to further reduce the level of contamination. This is an improvement, since without the use of steam, the native biota will still be present and compete with the introduced biodegradation biota. With the addition of nutrients to promote the activity of the biodegradation biota, in many instances the native biota proliferate instead of and/or in favor of the introduced biota, thereby overcoming the introduced biota and negating the effect of the biodegradation. Therefore, by essentially sterilizing the contaminated area, the introduced biodegradation biota will be more effective.

Referring to FIG. 3 there is shown in plan view an exemplary use of the present invention in a contaminated area. A plurality of injection wells 60 are sunk within and at the periphery of the suspected decontamination site. Spaced apart and located between two or more of the injection wells 60 are recovery wells 62. The injection wells 60 are all appropriately connected (not shown) to the steam outlet 64 from steam generator 66. The recovery wells 62 are all appropriately connected (not shown) to the recovery inlet 68 of the recovery unit 70 used for processing the water and contaminants described above in connection with FIG. 1. A water supply 72 is provided with line 74A and 74B to and from the condenser which comprises part of the recovery unit 70, and with line 76 to the steam generator 66. A mobile tanker 78 may be utilized to receive condensate (water and/or contaminants) via line 80 to be carried away off-site.

The foregoing description of the preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention and various embodiments and various modifications as suited to the particular use contemplated. It is intended that the scope of the invention be defined by the claims appended hereto.

What is claimed is:

1. A process for in situ decontamination of a contaminated subsurface area containing volatile contaminants, nonvolatile aqueous soluble contaminants and nonvolatile nonaqueous volatile contaminants, comprising the steps of:
   (a) constructing an injection well system comprising a plurality of injection wells proximate to the periphery of and/or located within said contaminated area;
   (b) constructing at least one extraction well disposed within said contaminated area and spaced apart from said injection wells;
   (c) concurrently injecting steam into said injection well system and applying subatmospheric pressure to said extraction well whereby steam is drawn in a substantially horizontal direction through said contaminated subsurface area to thereby heat said area, volatilize, and extract a substantial amount of said volatile contaminants from said area; whereby water, nonvolatile and volatile contaminants are withdrawn through said extraction well;
   (d) ceasing injection of said steam into said injection well system and continuing the application of subatmospheric pressure at said extraction well to withdraw residual steam and gases, and residual liquids from said subsurface area, which gases and steam are volatilized by the residual heat in said subsurface area.

2. A process according to claim 1 wherein said step (c) is conducted for a period of time sufficient to remove a substantial amount of said contaminants from said area.

3. A method according to claim 1 further comprising the step (e) of introducing to said area biota and nutrients therefor for biodegradation of any residual contamination.

4. A process according to claim 1 comprising repeating said steps (c) and (d).

5. A process for in situ decontamination of a contaminated subsurface area containing volatile contaminants, nonvolatile aqueous soluble contaminants and nonvolatile nonaqueous volatile contaminants, comprising the steps of:
   (a) concurrently injecting steam into an injection well system, said system comprising a plurality of injection wells proximate to the periphery of and/or located within said contaminated area, and applying subatmospheric pressure to at least one extraction well disposed within said contaminated area and spaced apart from said injection wells, whereby steam is drawn in a substantially horizontal direction through said contaminated subsurface area to thereby heat said area, volatilize, and extract a substantial amount of said volatile contaminants from said area; whereby water, nonvolatile and volatile contaminants are withdrawn through said extraction well;
   (b) ceasing injection of said steam into said injection well system and continuing the application of subatmospheric pressure at said extraction well to withdraw residual steam and gases, and residual liquids from said subsurface area, which gases and steam are volatilized by the residual heat in said subsurface area.

6. A process according to claim 5 wherein said step (b) is conducted for a period of time sufficient to remove a substantial amount of said contaminants from said area.

7. A process according to claim 5 further comprising the step (c) of introducing to said area biota and nutrients therefor for biodegradation of any residual contamination.

8. A process according to claim 5 comprising repeating said steps (a) and (b).

* * * * *